US009910801B2

(12) United States Patent
Ibrahim et al.

(10) Patent No.: US 9,910,801 B2
(45) Date of Patent: Mar. 6, 2018

(54) PROCESSOR MODEL USING A SINGLE LARGE LINEAR REGISTERS, WITH NEW INTERFACING SIGNALS SUPPORTING FIFO-BASE I/O PORTS, AND INTERRUPT-DRIVEN BURST TRANSFERS ELIMINATING DMA, BRIDGES, AND EXTERNAL I/O BUS

(71) Applicant: UNIVERSITI TEKNOLOGI MALAYSIA, Johor Bahru, Johor (MY)

(72) Inventors: Muhammad Nasir Bin Ibrahim, Johor Darul Takzim (MY); Namazi Bin Azhari, Selangor Darul Ehsan (MY); Adam Bin Baharum, Pulau Pinang (MY)

(73) Assignees: UNIVERSITI TEKNOLOGI MALAYSIA, Johor Bahru, Johor (MY); PAHLAWAN MIKRO, Sijangkang, Selangor Darul Ehsan (MY)

( * ) Notice: Subject to any disclaimer, the term of this patent is extended or adjusted under 35 U.S.C. 154(b) by 365 days.

(21) Appl. No.: 14/870,957

(22) Filed: Sep. 30, 2015

(65) Prior Publication Data
US 2016/0224485 A1 Aug. 4, 2016

Related U.S. Application Data

(60) Provisional application No. 62/032,111, filed on Aug. 1, 2014.

(51) Int. Cl.
G06F 12/06 (2006.01)
G06F 13/40 (2006.01)
(Continued)

(52) U.S. Cl.
CPC .......... *G06F 13/32* (2013.01); *G06F 13/4022* (2013.01); *G06F 13/4282* (2013.01)

(58) Field of Classification Search
CPC ....... G06F 13/32; G06F 13/4022; G06F 13/42
See application file for complete search history.

(56) References Cited

U.S. PATENT DOCUMENTS 3,401,376 A 9/1968 Barnes et al.
3,462,742 A 8/1969 Miller et al.
(Continued)

*Primary Examiner* — Henry Tsai
*Assistant Examiner* — Christopher A Daley
(74) *Attorney, Agent, or Firm* — Ladas & Parry LLP

(57) ABSTRACT

A processor or CPU architecture that implements many enabling technologies proven to enhance data through put supporting the synchronous burst data transfer. The Input-Output (I/O) is uniformly viewed and treated as an individual First-In-First-Out (FIFO) device. Pluralities of memory areas are implemented for user stack, kernel stack, interrupt stack and procedure call stack. Only one I/O arbiter is necessary for a CPU model that arbitrates between a plurality of FIFOs substituting data caches for on-chip implementation, thus eliminating traditional data transfer techniques using Direct-Memory-Access (DMA), bus control and lock signals leaving just the interrupt signals and the new synchronous signals for an easy and streamlined system design and CPU model. Supporting an interrupt-driven, FIFO-based I/O and synchronous burst data transfer the CPU employs a simple linear large register sets without bank switching.

15 Claims, 6 Drawing Sheets

The internal registers, and buses depicting the CPU model

(51) Int. Cl.
    *G06F 13/32*     (2006.01)
    *G06F 13/42*     (2006.01)

(56) References Cited

U.S. PATENT DOCUMENTS

| | | | |
|---|---|---|---|
| 3,518,632 A | | 6/1970 | Threadgold et al. |
| 5,293,590 A | * | 3/1994 | Keener ................ G06F 13/385 |
| | | | 710/316 |
| 5,535,420 A | * | 7/1996 | Kardach ................ G06F 13/24 |
| | | | 710/48 |
| 5,671,421 A | * | 9/1997 | Kardach ................ G06F 13/24 |
| | | | 710/260 |
| 5,881,253 A | * | 3/1999 | Seeman ............. G06F 13/4059 |
| | | | 710/263 |
| 6,128,691 A | * | 10/2000 | Haren .................... G06F 13/24 |
| | | | 710/260 |
| 6,895,508 B1 | * | 5/2005 | Swanberg ........... G06F 9/30043 |
| | | | 711/152 |

\* cited by examiner

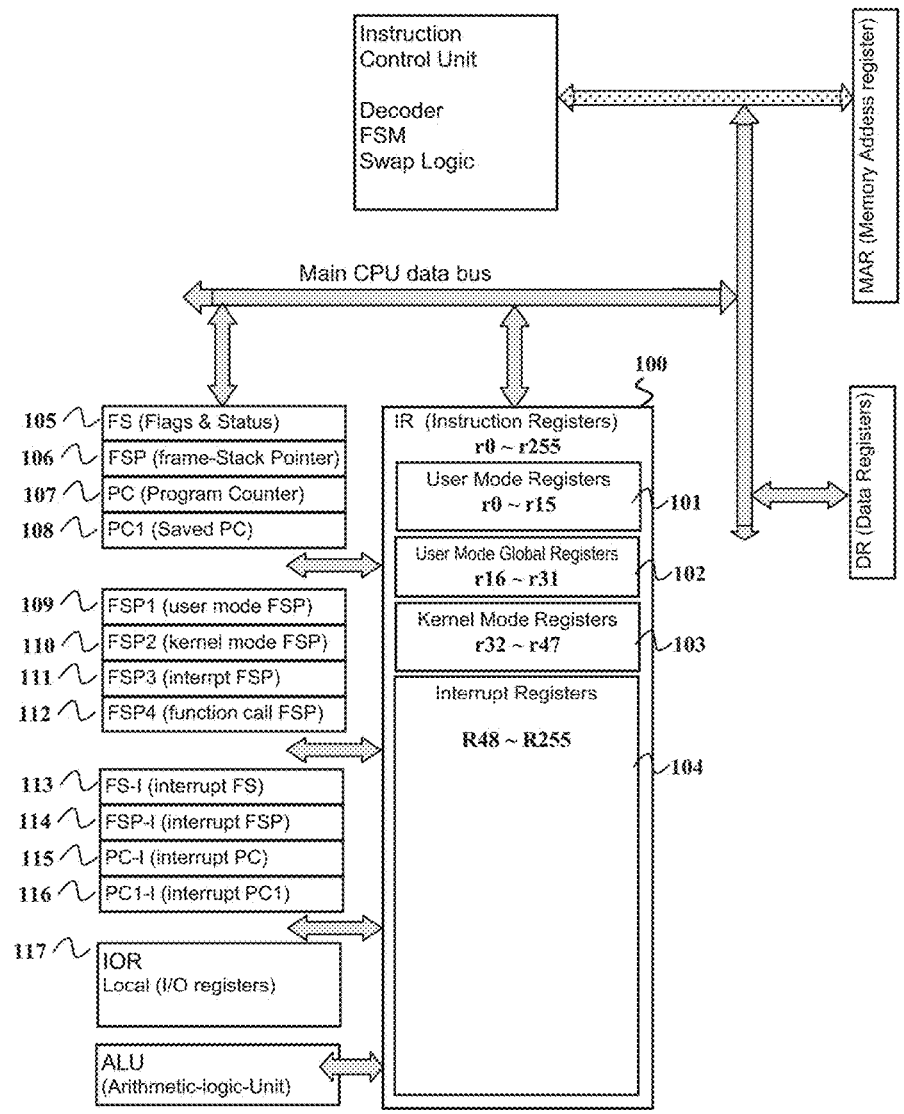
Fig. 1. The internal registers, and buses depicting the CPU model

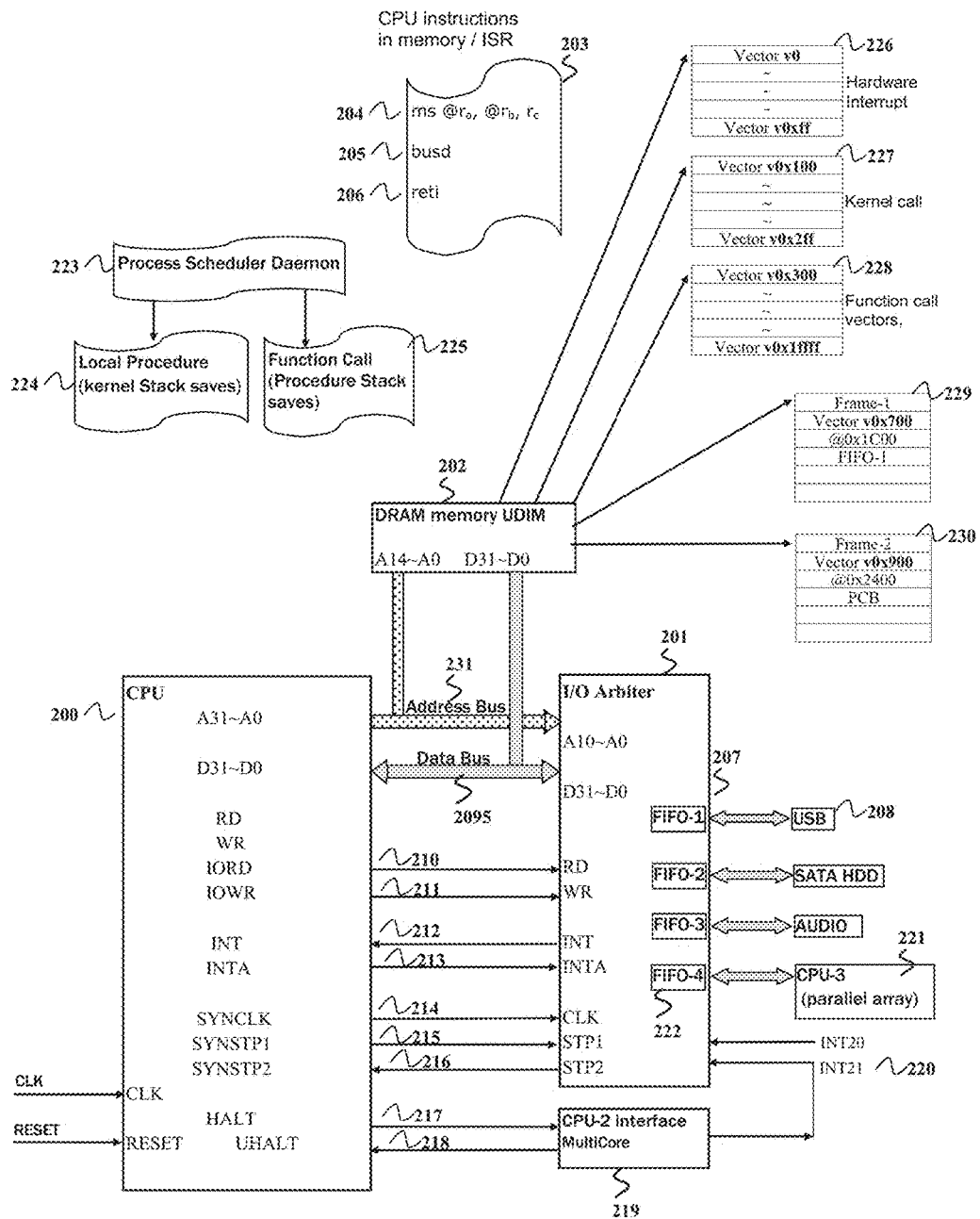
Fig. 2. The CPU interface signals in a preferred connection to illustrate interaction with ISR, vector tables, and devices

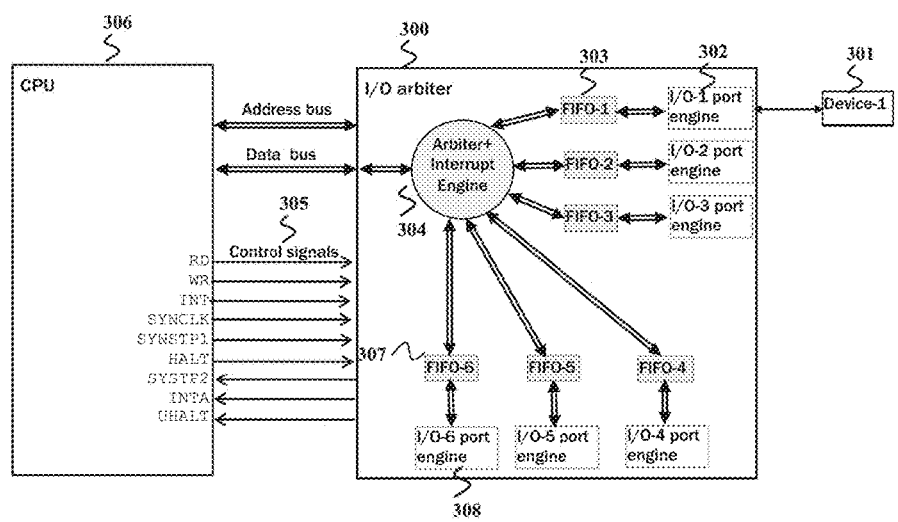
Fig. 3. Functional diagram of I/O arbiter companion module from Fig.2 redrawn to show CPU model with the nine control signals eliminating DMA, bridges, more than one arbiters, and an I/O bus such as the PCI

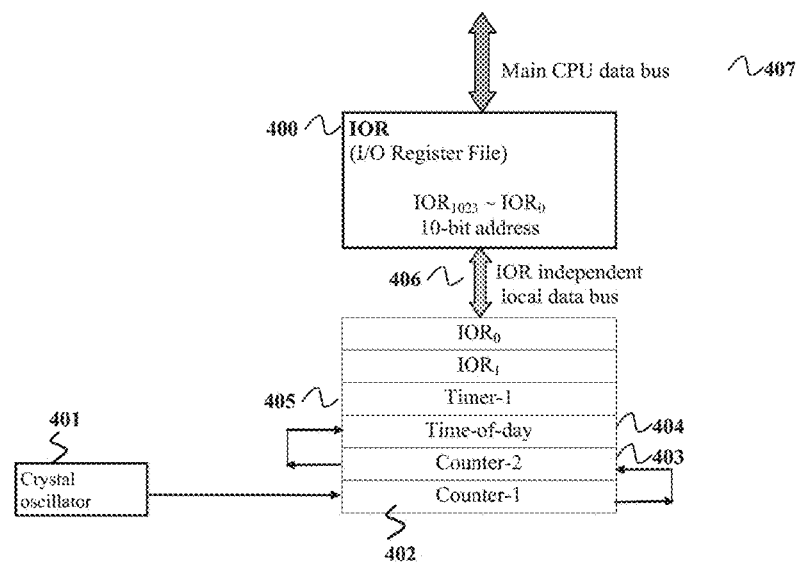
Fig. 4. Autonomous counters and time-of-day implemented in the IOR independent local bus

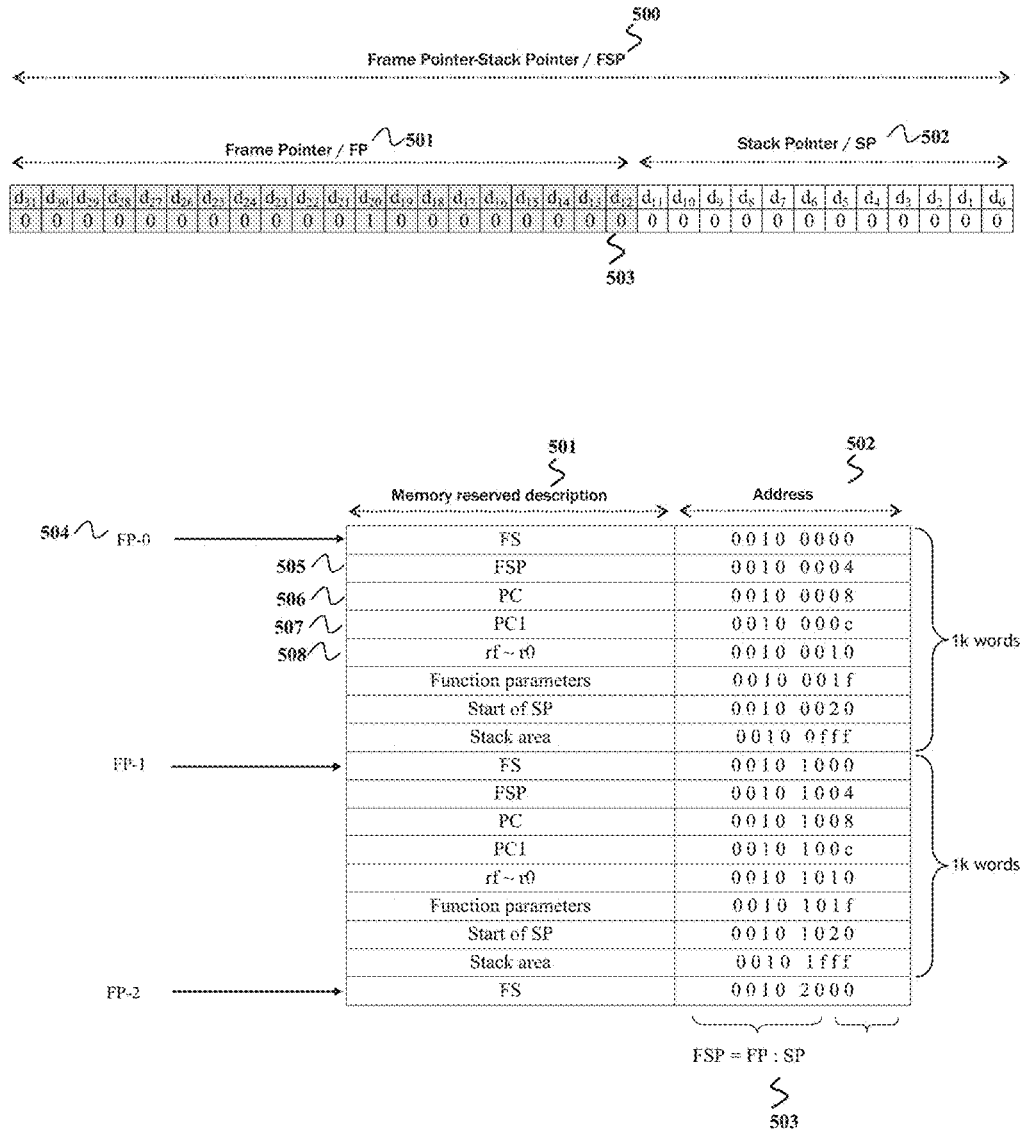
Fig. 5 Frame-Pointer:Stack-Pointer pair; the FSP consists of 20-bit FP & 12-bit SP used in procedure call

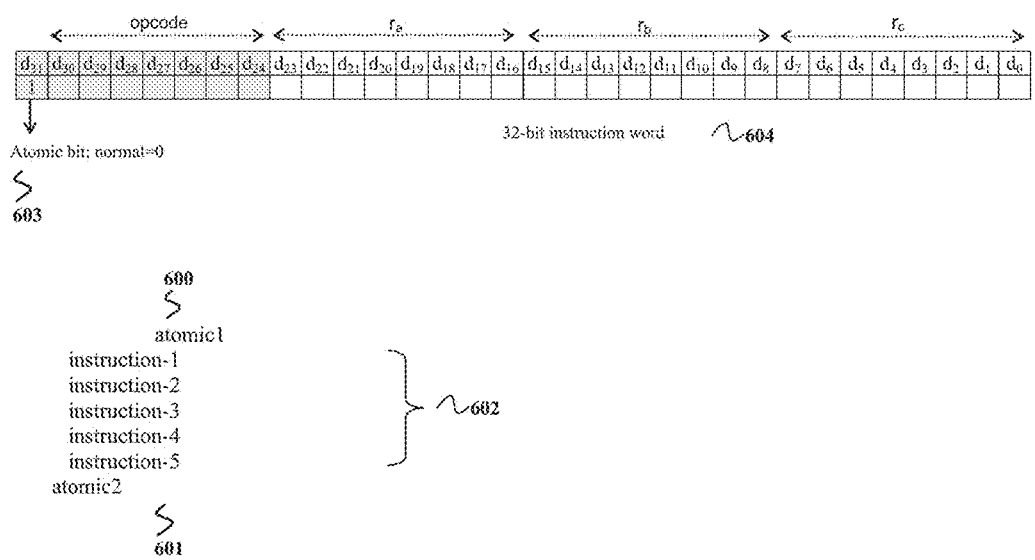
Fig. 6. Atomic block instruction pair; atomic1, and atomic2 which makes instructions 1-5 executing atomically or uninterrupted, by just toggling bit-31 from a 0 to a 1 in any instruction

PROCESSOR MODEL USING A SINGLE LARGE LINEAR REGISTERS, WITH NEW INTERFACING SIGNALS SUPPORTING FIFO-BASE I/O PORTS, AND INTERRUPT-DRIVEN BURST TRANSFERS ELIMINATING DMA, BRIDGES, AND EXTERNAL I/O BUS

RELATED APPLICATION INFORMATION

This claims the benefit of U.S. Provisional Application No.: 62/032,111 filed Aug. 1, 2014, and incorporates the same by reference.

TECHNICAL FIELD

This invention relates to microprocessor and computer architecture.

BACKGROUND OF THE INVENTION

History of CPU Architecture

Many current processor or CPU architectures borrow from the IBM 360 (announced in 1964) which had both characteristics of CISC and RISC designs. The design already considered multiprocessing requirements with specific instructions as it was envisioned for the business and scientific computing needs. Most CPU designs were conceived for expected use around the Operating System (OS) software of the day, which were mostly proprietary. Up to this point, the computer was manufactured from discrete logic gates, resulting in the whole system occupying a few equivalent rooms in a house. The invention of a processor using discrete logic was already described in the U.S. Pat. No. 3,401,376 filed by G. H. Barnes et al in 1965, and granted patent in Sep. 10, 1968. Also U.S. Pat. No. 3,518,632 filed by R. Threadgold et al in 1967, which was granted patent in Jun. 30, 1970.

The story of the CPU can be said to begin in 1961 when Fairchild commercialized the first IC, after they and Ti invented it in 1959. In 1966 a patent filing U.S. Pat. No. 3,462,742 by Henry S. Miller et al of RCA Corp. which was granted patent in 1969 described a processor system made of many integrated circuits containing some 200 or so logic gates. This was a departure from an all discrete logic circuits.

Soon it was generally recognized that if certain modules that made up the processor was aimed to be shrunk into an IC, it was only natural to assume that the next step was to put everything in an IC which would become the microprocessor, only that the technology was not feasible. In 1971 Intel produced the first microprocessor the Intel 4004 packaged in a 16-pin IC, and consisted of a 4-bit data bus, 12-bit address bus, sixteen 4-bit registers, four 12-bit registers, that ran at 750-khz clock. This was the simplest of all CPUs which embodied the classic Von Neumann architecture and was the starting point for CPU architectures.

In the seventies Unix was being used in the mainframe computers of the universities and corporate world. And in the late seventies when personal computers became affordable to the masses, the major OS were the single tasking Apple DOS, and CP/M. Multitasking for the masses, ie., the IBM PC clones in the form of Unix versions such as BSD Unix from Berkeley, and Xenix from Santa Cruz Operations, became available not long after IBM Corp. introduced the IBM PC in 1981, and with it the MSDOS, a single-tasking environment up to 1990 when Windows began to take hold.

In 1988 a portable operating system; the Portable-Operating-System-Interface-for-Unix (POSIX) was developed around a kernel with uniform function calls which described consistent behaviour of processes that can be ported to all high-performance CPUs. This standardized the disparate OS at the kernel and Application-Interface (API) which influenced the CPU architectures to support it.

Almost all new popular CPU architectures were designed from the middle eighties (Intel Pentium onwards came from the old 8086 design of 1978) and nineties from familiar CPU architectures such as the ARM in 1985, MIPS R2K in 1986, Sun Sparc in 1987, AMD 29K in 1988, Intel i960 in 1988, Motorola PowerPC in 1992, DEC Alpha in 1994, and Intel Itanium in 2002.

Almost all of these CPUs were of complicated designs except for the ARM, i960, and AMD 29K. Later architectures were superscalar, superpipelined, with branch prediction and other complex schemes, but in the end produced benchmarks not much better than the clean design of these three. Many of the concepts such as the rotating windows of Sun Sparc proved to be a bottleneck and inefficient. Unfortunately even these three left many desired features since they came before Posix was established, and in particular, Linux.

The demands of applications in a Posix environment such as the PC (Personal-Computer) and embedded system, packet data-flow in routers, and addition of modules, requires a CPU board to use DMA, multi-bridges, multi-arbiters, and I/O expansion bus such as the PCI and its variants. The CPU is expected to include these traditional components with the correspondingly complex interfacing scheme.

SUMMARY OF THE INVENTION

A Need for Simple Yet Powerful CPU Architecture within the Posix Environment

Simple in this invention means easy to learn and easy to implement within a Posix interface which describes a powerful computer environment. Easy to learn comes from a streamlined architecture, concept and model with very few or no special cases, but one which better maps CPU processes within the Posix environment.

Implementing a particular system design whether in SOC (System-On-Chip) or in a board is made easier with less complex interfacing signals, which in turn will result in a correspondingly simpler isolation of problems in troubleshooting after fabrication. For example, troubleshooting a system with two arbiters and two bridges is much harder than a system with only one arbiter without any bridge. Consider the complexity of the communication processor used in many high-end routers, the IXP435 with three bus bridges and three bus arbiters. Also roughly the same complexity for the IA-32 (Intel i86) architecture of the PC with the North bridge, South bridge, and another arbiter-bridge pair with the PCI interface. This alternative CPU invention needs only one arbiter for all cases without using any bridge at all.

Most CPUs need DMA, Lock, and Bus Request signals with their associated complex support protocol to transfer data in block I/O devices when the same can be achieved better by just using the commonly available and understood interrupt signals. In the end, these signals require an interrupt mechanism to function properly whereas the converse is not true; an interrupt alternative can circumvent them. Hence the heavy relying of this invention on an interrupt-driven mechanism.

Reducing complex interface signals must be followed by another simple view of I/O devices when everything can be reduced to a bunch of FIFOs and treated the same. In just one stroke, every peripheral and device, including multi-core CPU, and parallel array architecture become simple to connect.

Another notable mechanism is the simple vector ID which has its origins in the descriptor tables of the old Burroughs computer of the seventies, which proved to be invaluable for fast interrupt response, fast access of parameters in a given memory frame, and efficient means of accessing PCB (Process-Control-Block) descriptors.

Given the above, by themselves cannot result in high computing throughput without an efficient means of data transfer. This is achieved with the synchronous burst data transfers in block memory (register-memory) transfer as well as I/O via FIFOs.

A combination of these proven technologies supported by the corresponding CPU instruction set which enables these capabilities will result in a simple and powerful CPU architecture.

This invention describes a CPU model which uses a set of interfacing signals that support an interrupt-driven processing of FIFO-based I/O with synchronous burst data transfer. The CPU model supports an architecture that efficiently maps a corresponding set of instructions to the Posix interface that underlies the operating system of a personal computer, as well as in embedded systems.

The CPU model makes creative use of a few known enabling technologies to effect high data throughput, and combining them in such a way to have a non-conventional view of data processing.

The proven enabling technologies are: synchronous burst data transfer, FIFOs, separate memory areas for different stacks, autonomous local I/O registers (IOR), and vector descriptors. Complicated technologies such as cache memory manipulation, register renaming, pipelining and other data-dependent manipulating schemes are left out. Large data caches in which the effectiveness is probabilistic in nature are substituted by a deterministic array of FIFOs.

This CPU model is centered around interrupt-driven signal handshaking schemes, using the commonly understood interrupt mechanism of the INT-INTA (Interrupt-Interrupt Acknowledge) pair of signals in conjunction with a new set of synchronous burst data transfer signals. This brings the simple philosophy of interrupt-driven processes. When every event is interrupt-driven, many things happen, i.e., many traditional bus control signals can be made redundant, thus eliminating the DMA, bus bridges, multi-arbiters, and I/O bus such as the PCI and its variants.

Interrupt-driven processes should adapt very well in a preemptive multitasking kernel such as Linux which has the process scheduler which is a daemon, interrupting a running process by a timer tick, meaning it is also interrupt driven.

BRIEF DESCRIPTION OF THE DRAWINGS

These and other features, aspects and advantages of the present invention will be more fully understood when considered with respect to the following detailed descriptions, appended claims and accompanying drawings wherein:

FIG. 1 shows the internal registers, and buses depicting the CPU model;

FIG. 2 shows the interface signals in a preferred connection to illustrate interaction with ISR, vector tables, and devices;

FIG. 3 shows a functional diagram of I/O arbiter companion module from FIG. 2 redrawn to show CPU model with the nine control signals eliminating DMA, bridges, more than one arbiters, and an I/O bus such as the PCI;

FIG. 4 shows autonomous counters and time-of-day implemented in the IOR independent local bus;

FIG. 5 shows the Frame-Pointer:Stack-Pointer pair; the FSP consists of 20-bit FP & 12-bit SP used in function call;

FIG. 6 shows an atomic block instruction pair; atomic1, and atomic2 which makes instructions 1-5 executing atomically or uninterrupted, by just toggling bit-31 from a 0 to a 1 in any instruction.

DETAILED DESCRIPTION OF THE PREFERRED EMBODIMENTS

Hereinafter, the present invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

Referring to FIG. 1 the CPU model presents a single contiguous set of 256 working registers (100) labeled $r_0$~$r_{255}$ which can be used as both data and address pointer. The register use is orthogonal and all instructions can be applied to any of them. The registers are partitioned into 16 local user mode registers (101) $r_0$~$r_{15}$, 16 global user mode registers (102) $r_{16}$~$r_{31}$, 16 local kernel mode registers (103) $r_{32}$~$r_{47}$, and the rest for interrupt mode (104); partitioned and assigned according to usage for common and persistent tasks like the process scheduler, and from interrupt sources (208) (220) such as a USB device, and other fast peripherals. The single large register space (100) greatly reduces the need for parameter passing.

The rules governing the register sets are as follows: the user mode can only see $r_0$~$r_{31}$ (101)(102), while the kernel mode and the interrupt mode which is a kernel mode process (103) (104) see all 256 registers with no bank switching; a context switch in user mode (101) saves registers $r_0$~$r_{15}$, and the kernel-mode context switch saves registers $r_{32}$~$r_{47}$ (103) to their respective memory locations; registers $r_{16}$~$r_{31}$ (102) are used for passing parameters for both the user and kernel modes.

There are a total of twelve control registers consisting of four main current control registers: a current Flags/Status (FS) (105), a current Frame:Stack-Pointer (FSP) (106), a current Program Counter (PC) (107), a second current Program Counter (PC1) (108); four Frame:Stack-Pointers: FSP1 (109) for user mode stack, FSP2 (110) for kernel mode stack, FSP3 (111) for interrupt stack, and FSP4 (112) for function call stack.

In supporting the FIFO buffer oriented I/O, one I/O arbiter (201) may be implemented into the CPU core (200) (306), or implemented as a separate I/O arbiter chip (201) (300) which takes advantage of the CPU synchronous burst transfer, and FIFO buffering mechanism to eliminate other arbiters, DMA mechanism, bus control signals, and an I/O bus such as the PCI.

In addition to the CPU control registers, there exists a local I/O register file (IOR) (117) (400) which is dual ported, and having a total of 1024 words of addressable memory of which one word equals four bytes or 32 bits. This IOR (117) (400) file uses the same signals as an external I/O addressing, which are the Input/Output Read (IORD) signal (210), and the Input/Output write (IOWR) signal (211). The external I/O addressing signals are used to access the I/O arbiter chip (201) (300) and in turn the FIFOs of devices; (303) to (307) as shown in FIG. 3.

In a first embodiment of the present invention, in a typical computing process involving data transfer to an I/O device which is through its FIFO, which in this example using FIFO-1 (207); the CPU (200) in kernel mode performs a certain data operation on a block of data in memory (202). The block of data is moved into all of the CPU registers (103) for maximum efficiency, a block of the register set at a time. After completion of operation, part of the block of registers is sent to some other memory locations.

Therefore a block of data needs to be read into a memory frame. Frame-1 (229) before a set of CPU operations can begin as described earlier. This is done by an I/O port to memory read in a synchronous burst data transfer. A CPU instruction (203) reads FIFO-1 (207) using the IORD signal (210), SYNCLK (214), SYNSTP1 (215), SYNSTP2 (216) signals until FIFO-1 (207) is empty. I/O arbiter (201) then activates SYNSTP2 (216) indicating end of data, in which CPU (200) stops reading.

Similarly, writing to FIFO-1 (207) which is connected to a USB device (208), uses the IOWR signal (211), SYNSTP1 (215), SYNSTP2 (216) signals. Writing is done by a burst write a frame of memory, in Frame-1 (203) to the FIFO-1 (207), when a predetermined block of data is completed, the CPU (200) activates SYNSTP1 (215) signal indicating to the I/O arbiter (201) the end of transfer.

On the other hand, receiving data from a device such as the example of the USB device (208) as described earlier, the view is the same as FIFO-1 (207) wants to send data. FIFO-1 (207) tells the I/O arbiter (201) which in turn activates the interrupt (INT) (212) signal. On receiving the interrupt acknowledge (INTA) signal (213), the I/O arbiter (201) places FIFO-1 (207) vector ID on the data bus (209). CPU (200) reads the vector ID and jumps to the address corresponding to the ID. CPU (200) enters kernel mode and all 256 registers (100) from r0~r255 are made available to the CPU (200) in which it uses only those reserved for FIFO-1 (207) interrupt-service-routine (ISR) (203). The ISR (203) knows it is a request from FIFO-1 (207) to burst read data using the IORD (210), SYNCLK (214), SYNSTP1 (215), and SYNSTP2 (216) signals. When the burst read is over, CPU (200) activates SYNSTP1 (215) signal indicating end of read to FIFO-1 (207). ISR (203) exits interrupt upon execution of the reti (206) instruction.

In a second embodiment of the present invention, which mimics a DMA transfer, another device or another CPU; CPU-2 (219), in a multiprocessor connection wants access to the data bus, it activates the INT signal (212) by way of I/O arbiter INT21 (an example number) signal (220), in which the CPU (200) jumps to the address assigned to the vector ID of CPU-2 (219). In the ISR (203), CPU instruction busd (205) disables all buses and executes a halt instruction in which CPU (200) activates the HALT signal (217) and stops executing instructions and wait for the hardware UHALT signal (218) from CPU-2 (219). At this point CPU-2 (219) gains access to CPU address (231) and data (209) buses until it activates UHALT signal (218) in which CPU (200) returns to normal and executes next instruction typically the reti (206) in which ISR exits interrupt.

In yet another alternative of a DMA transfer, CPU-3 (221) connected via L/O arbiter (201) using FIFO-4 (222) can access a block of memory, or a memory buffer, Frame-1 (229). L/O arbiter (201) activates the CPU INT signal (212), and after receiving INTA signal (213) after which, the interrupting device by way of the I/O arbiter (201) places the vector ID of the device (221) on the data bus (209). CPU (200) knowing its source, executes a routine to synchronously burst transfer memory buffer, Frame-1 (229) to FIFO-4 (222) just like any other device, without ever needing to disable the buses.

In a third embodiment of the present invention, a hardware interrupt mechanism is devised to create an almost zero housekeeping instructions for a fast and efficient interrupt processing in an ISR (203). An interrupt request is activated by means of the INT signal (212) from an external source such as an I/O arbiter (201). The CPU (200) answers with an INTA signal (213) after which, the interrupting device such as a USB device (208) by way of the L/O arbiter (201) places the vector ID of the device (208) on the data bus (209). CPU (200) then reads the vector ID and makes a direct jump to the vector ID address. Vector 'va' denotes the vector 'a' which is equivalent to the ID number and can take up to 18 bits in value. The CPU (200) recognizes only 256 hardware interrupt sources as reserved in the hardware interrupt vectors memory space (226).

Before executing the first instruction in the ISR (203) corresponding to the vector ID, current main control registers consisting of the FS (105), the FSP (106), the PC (107), and the PC1 (108) are saved to a dedicated set of four copies of the said registers in interrupt mode consisting of: an interrupt Flags/Status (FS-1) (113), an interrupt Frame-Stack-Pointer (FSP-I) (114), an interrupt Program-Counter (PC-I) (115), and a second interrupt Program-Counter (PC1-I) (116).

Then the current kernel mode FSP (106) is loaded with the interrupt frame stack pointer FSP3 (111) and the PC (105) is loaded with the pointer located at the vector ID, and the ISR begins there. No other instructions are necessary in which the first instruction can contain the actual ISR (203) codes; with the requirement of only a reti (206) instruction. In the interrupt mode all the 256 registers (100): $r_{255}$~$r_0$, are visible with $r_{255}$~$r_{48}$ (104) actually reserved by convention.

On exiting the ISR (203) with a reti (206) instruction, the previously saved interrupt registers FS-I (113), FSP-I (114), PC-I (115), and PC1-I (116) are copied back to the current main control registers FS (105), FSP (106), PC (107), and PC1 (108) which restores previous machine state.

In a fourth embodiment of the present invention, in which the CPU architecture depicts the interplay mechanism of the interface lines and FIFOs is shown to eliminate DMA, bridges, more than one arbiters, and an I/O bus such as the PCI. The I/O arbiter (201) in FIG. 2 is redrawn to become the I/O arbiter (300) in FIG. 3 to show how these traditional CPU components are eliminated. Although this patent description describes a separate companion chip for the I/O arbiter (201), it can be incorporated into the CPU (306) itself, substituting on-chip data caches (which is the norm for other processor models) for FIFOs.

Referring to FIG. 3, the interface ports for I/O devices such as in Device-1 are all the same, and consistent when they are all presented to the I/O port engine such as I/O-1 port engine (302). The main function of the port engine is to convert serial to parallel if input, and vice-versa if output for serial devices. Data between devices are stored in memory buffers in FIFO's such as FIFO-1 (303). A plurality of disparate devices can be connected to the respective I/O port engines (302)~(308) in which data transfers are handled autonomously by the engines, ending up in the FIFOs (303)~(307). Once in the FIFOs such as FIFO-1 (303), the arbiter+interrupt engine (304) autonomously decides which FIFO to service, according to a rule configured during initialization time. The CPU (306) then executes a synchronous burst data transfer in DMA fashion between the FIFOs as presented by the arbiter+interrupt engine (304) using the nine CPU control signals (305). Also during initialization the arbiter+interrupt engine (304) is configured for the length of data buffer in the FIFOs (303)~(307). For very slow devices, the buffer can be very small, taking the minimum value of just one. For very fast devices, the buffer size can take the maximum value. Thus a bridge is unnecessary as different data rate of the devices are accommodated by the buffer sizes in FIFOs (303)~(307). Additionally, only one I/O arbiter which is the arbiter+interrupt engine (304) is required for as many FIFOs that is possible to implement within a single chip, eliminating the I/O bus such as the PCI.

In a fifth embodiment of the present invention, a local I/O register file (IOR) (117) (400) which can be dual-ported is utilized to create an independent local bus (406) which can implement an autonomous hardware function or an engine in one of such embodiments, a time-of-day function. The IOR (117) (400) can be addressed by a 10-bit word for up to 1024 registers in the kernel mode and can also be used to store local system variables.

Referring to FIG. 4, in the preferred embodiment, a hardware realtime clock engine which periodically updates a time-of-day counter (404) is constructed from other counters; counter-1 (402), and counter-2 (403).

A stable crystal clock source (401) at a certain frequency in the megahertz range runs a first counter, counter-1 (402) in which after a certain period of time according to the word written to it, updates a second counter, counter-2 (403) in which after a certain period of time according to the word written to it, in turn updates a time-of-day counter (404).

A timer engine in similar fashion to the time-of-day engine may be constructed and implement timer-1 (405). The CPU (200) by way of the main data bus may be allowed to read any of the counter registers (402) (403) (404) (405) to implement all timer related functions. The time-of-day register (404) may be able to cause interrupts on events such as that required by the Linux cron daemon. While in FIG. 4 only two timers are shown to have been constructed, it should be obvious to a person skilled in the art that more than two timers may be constructed using the IOR (117) (400) as it runs autonomously over an IOR independent local data bus (406), and concurrently with the main data bus (407) being active.

In a sixth embodiment of the present invention, a plurality of Frame-Stack-Pointers are implemented, in particular to support the procedure call instructions involving the function fn va and the system sys va instructions utilizing a vector 'va' notation as described in claim 3. In addition to the jump and link (jl a) instruction, and the call instruction (call a) which are local and used in one task and use the same FSP (106) (500) as the task, the CPU (200) implements a function call instruction fn va using a vector mechanism, where 'fn' is the mnemonic for function, 'v' for vector, and 'a' the vector number or ID. This function call can be invoked from any task or program and is reentrant.
Refer to FIG. 5

The FSP (106) (500) is defined as a 20-bit frame pointer (FP) (501) and a 12-bit stack pointer (SP) (502). This allows a SP (502) size of 1 k words. The above FP: SP word or FSP (106) (500) shows FP-0 (504) which is initialized to 0x00100000.

The basic mechanism in every function call is shown in FIG. 5. On every function call, a new FP (501) is created simply by incrementing the FP (501). This is automatically done by the CPU (200) by adding a 1 to bit-12 ($d_{12}$) (503) or equivalently, adding 0x1000 to the FSP (500) word. The current FSP (500) is saved to FSP4 (112) which is designated as the frame stack pointer for function call fn va. The current FS (105), FSP (106). PC (107), and PC1 (108) are saved to offsets from the starting of FP-0 (504). The whole local register-set (101) is saved to an offset from the location pointed by FP-0 (504). The PC (107) is loaded with the pointer at the function vector address, and program is transferred there.

Conversely, on retf instruction (return from function call) the current FP (501) is decremented, all registers are loaded with the saved set an offset from the new FP (501). This is automatically done by the CPU (200) by subtracting a 1 to bit-12 ($d_{12}$) (503) or subtracting 0x1000 to the FSP (500) word. Program is transferred to the old PC (506). This goes one nesting level up, and on the next retf instruction encountered, the FP (501) is decremented again and the return process is repeated.

In a seventh embodiment of the present invention, in which the CPU architecture created instructions utilizing a vector ID or vector 'va' notation, and exemplifying use in some representative instructions.

other than in interrupt descriptors for ISR (203), is that of descriptor tables such as the PCB (process-control-block), and FIFO buffers in main memory for position independent codes. The vector IDs are reserved memory locations from the beginning of address space 0 to 0x7ffff. They are defined as hardware interrupt vectors (226); from 0x0 to 0xff, kernel call vectors (227) from 0x100 to 0x2ff, and the rest from 0x300 to 0x1ffff (228) for function call vectors and other descriptor tables.

In one FIFO embodiment, FIFO-1 207 fmemory buffer, Frame-1 (229) can be just referenced as v0x700, which is located at memory location 0x700×4=0x1C00. So memory location 0x1C00 contains FIFO-1 main memory buffer. Similarly, in a buffer use, a data array can be referenced as v0x900 (230) shown as Frame-2, or the frame pointer is located at memory 0x900×4=0x2400. To access the $100^{th}$ array, just use the CPU instructions below;
m v0x700, $r_1$=>move vector v0x700 to register $r_1$
m @$r_1$, $r_2$=>move data pointed by register $r_1$ to register $r_2$
in which v0x700 is the notation for vector 0x700. 'm' is the mnemonic for 'move' and the character '@' implies 'at location', and 0x is the prefix notation for hexadecimal. The assembly instruction reads from left to right.

$r_2$ now contains actual pointer to the buffer of array in Frame-1 (229).
The $100^{th}$ member is then;
m @$r_2$+100, $r_3$=>move data pointed by @$r_2$+100 to register $r_3$
Or the $101^{th}$ member; m @$r_2$+101, $r_3$
Once the vector ID is used to get the actual pointer, $r_2$ now can be used as the base pointer, and variables within the vector ID or descriptor can be accessed by indexing from the base pointer $r_2$.

Also, the vector notation can be used in a jump instruction; jp va; where 'jp' is the mnemonic for 'jump', 'v' for 'vector', and 'a' the vector number or ID (identifier).

On encountering this instruction, the CPU will transfer the PC (Program-Counter) to the vector number 'a', specifying the address 'a'×4 containing the actual PC address to jump to.

In yet another instance of the CPU architecture exemplifying use of vector ID, and synchronous burst transfer operation, is that of loading a frame of parameters from a memory location. A frame of parameters here is defined as sixteen contiguous 32-bit words in memory that maps to the user or kernel mode local register set.

The CPU instruction; ms @va, $r_b$ in which 'ms' means "Move synchronously or burst-move a block of data 16 words beginning from vector 'a' to 16 registers beginning from $r_b$". 'v' is mnemonic for 'vector', and 'a' is the vector ID.

The frame of a block of data known as a frame, shown as Frame-1 (229), which is the start of Vector V0x700 address, is a contiguous set or frame of sixteen 32-bit data words. This frame of 16 words are transferred in burst fashion on every SYNCLK 214 cycle.

In an eighth embodiment of the present invention, all instructions can be made to run atomically which is required in synchronization of processes in a multiprocessing system which typically involves a memory access, and a device access. The memory access is in one location or a block of critical memory (critical region). Traditionally, an atomic instruction operation that preserves coherency in the read-modify-write sequence in one unbroken operation at the CPU level enables other higher more flexible synchronization mechanisms to enforce Mutex (Mutually-Exclusion) resources; in which if one process gets access, the others have to wait.

Refer to FIG. 6

In this embodiment all Mutex primitives are removed and replaced with a single block atomic instruction, with a prefix and postfix pair; atomic1 (600), and atomic2 (601). Therefore, the atomic instruction pair can encapsulate a block of instructions (602) to execute atomically. The instructions within the block (602) no matter how long they may be will execute sequentially uninterrupted. This atomic1 (600)-atomic2 (601) pair can make all instructions atomic by just setting the MSb bit31 (603) of the instruction word (604) to a "1" indicating an atomic instruction as shown in FIG. 5. Therefore traditional atomic instructions such as xchg (Intel 8088), compare-exchange, compare-decrement in other CPUs can be eliminated. Also it is a superset of a block-like atomic instructions as implemented in the Intel x86 or IA-32 instruction set in which only a few selected instructions can be applied and used.

The atomic1 (600)-atomic2 (601) pair is only seen at the source level by the programmer as an assembler directive.

The present invention or any part(s) or function(s) thereof may be implemented using hardware, software, or a combination thereof, and may be implemented in one or more computer systems or other processing systems. The computer system can include a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer program medium or computer usable storage medium having stored therein computer software and/or data. The terms "computer program medium" and "computer usable storage medium" are used to refer generally to media such as the removable storage drive, a hard disk installed in the hard disk drive, and signals. These computer program products provide software to the computer system. Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

The invention claimed is:

1. A central processing unit (CPU), comprising:
   a. a set of linear 256 registers, wherein the set of linear 256 registers is not bank switched, and is partitioned into sets according to modes including a user mode, a kernel mode, and an interrupt mode;
   b. a First-In-First-Out (FIFO) buffer oriented Input/Output (I/O) which is interrupt-driven presenting devices as being homogenous to the CPU;
   c. an I/O arbiter, wherein the I/O arbiter is configured to be integrated into a core of the CPU or implemented as a separate I/O arbiter chip, and wherein the I/O arbiter allows the CPU to be free of Direct-Memory-Access (DMA) mechanism, bus control signals, bus bridges, and an I/O bus; and
   d. a local I/O or I/O register (IOR) which is integrated within the CPU with a uniform I/O addressing, and an external I/O;
   wherein the CPU performs a separate memory allocation for four different stack operations including a user stack, a kernel stack, an interrupt stack, and a procedure call stack, and
   wherein the CPU performs a consistent method of data transfer with signals supporting block, and synchronous burst modes.

2. A CPU according to claim 1, wherein the CPU uses a plurality of signals comprising a memory read signal (RD), a memory write signal (WR), an I/O read signal (IORD), an I/O write signal (IOWR), a synchronous data transfer clocking signal (SYNCLK), a synchronous data transfer first stop signal (SYNSTP1), a synchronous data transfer second stop signal (SYNSTP2), an interrupt signal (INT), an interrupt-acknowledge signal (INTA), a HALT signal, and a UHALT signal.

3. A CPU according to claim 1, wherein the CPU uses a notable instruction set using a vector notation and reference which is consistently used in instructions comprising hardware and software interrupts, and move (load-store) instructions to move a vector va into a register r1, where "v" is the mnemonic for "vector" and "a" a vector number or ID (identifier).

4. A CPU according to claim 1, wherein the CPU subjects every instruction to be made atomic by setting an instruction word at bit-31 (d31) in the Little-Endian ordering, wherein any instruction with bit-31 (d31)=0 executes normally, but is atomic when bit-31 (d31)=1, wherein a block of instructions with bit-31 (d31)=1 executes atomically, removing the need for explicit atomic instructions, and wherein a block of instructions can also be made atomic.

5. A CPU according to claim 1, wherein the set of linear 256 registers can be operated on by CPU instructions, wherein the set of linear 256 registers are numbered from r0 to r255 and partitioned into four register sets including: a. a first set (r0-r15) comprising 16×32-bit local registers for the user mode; b. a second set (r16-r31) with 16×32-bit local registers for user mode global registers; c. a third set (r32-r47) with 16×32-bit local registers for kernel mode; and d. a fourth set (r48-r255) with 208×32-bit registers for kernel mode global registers and interrupt service use.

6. A CPU according to claim 1, wherein a programming model sees the following among the set of linear 256 registers r0-r255: a. in a user mode, only registers r0-r31; b.

a set of user mode local registers r0-r15; c. a set of registers r16-r31 as user mode global registers which remain unchanged across all processes; d. all the 256 registers with no bank switching in the kernel mode and the interrupt mode which is also a kernel mode process; e. register set r32-r47 which is reserved for kernel local registers; and f. a user mode global register set r16-r31, which is reserved for use in passing parameters from the set of user mode local register r0-15.

7. A CPU according to claim 1, wherein the CPU comprises twelve CPU control registers which are not visible to a programmer, and are necessary to describe a current CPU executing state ensuring correct returns to previous function calls, wherein the twelve CPU control registers comprise:
   I. four main CPU control registers consisting of:
      a. a current Flags/Status (FS),
      b. a current Frame-Stack-Pointer (FSP),
      c. a current Program-Counter (PC), and
      d. a second current Program-Counter (PC1);
   II. four Frame-Stack-Pointers consisting of:
      a. a Frame-Stack-Pointer-1 (FSP1) for user stack,
      b. a Frame-Stack-Pointer-2 (FSP2) for kernel stack,
      c. a Frame-Stack-Pointer-3 (FSP3) for interrupt stack, and
      d. a Frame-Stack-Pointer-4 (FSP4) for procedure call or function call stack; and
   III. four copies of the main CPU control registers in interrupt mode consisting of:
      a. an interrupt Flags/Status (FS-I),
      b. an interrupt Frame-Stack-Pointer (FSP-I),
      c. an interrupt Program-Counter (PC-I), and
      d. a second interrupt Program-Counter (PC1-I);
   wherein the twelve CPU control registers are not accessible and operable by software instructions, with the exception of the FS register,
   wherein access to the FS register is only permitted with a kernel mode instruction which moves the FS register to the set of linear 256 registers to mask out the bits in the fields as a result of internal hardware traps.

8. A CPU according to claim 7, wherein CPU architecture of the CPU defines and implements a native Frame-Pointer (FP) and Stack-Pointer (SP) pair, designated by FP:SP within a single internal CPU register labeled as the FSP, wherein the FSP is defined as a 20-bit FP and a 12-bit SP, wherein in any given FSP word, the FP is defined from bit-31 to bit-12 (or d31-d12), wherein since addressing in this CPU architecture is on a 32-bit word and bit-1 and bit-0 (or d1 & d0) are unused, the SP can contain up to 1024 words which are made up of register set, passed parameters, and pushed words, wherein the SP is always an offset to the FP and, wherein whenever the SP (or d11-d2) reaches all "1"s, ie., 0xfff, a hardware trap which is an interrupt to a vector ID v254 occurs with an appropriate bit set in a trap word.

9. A CPU according to claim 3, wherein the CPU implements up to 128 k, equivalent to 131,072 (0x20000) vectors from a vector ID v0 to vector ID v0x1fff containing pointers to interrupts, system calls, descriptor-tables, and others which are labeled and numbered from v0x0 to v0x1ffff, and wherein the vectors are partitioned according to modes and purpose as follows:
   a. v0 to v0xff are assigned to hardware interrupts in kernel mode;
   b. v0x100 to v0x2ff are assigned to system call vectors in kernel mode;
   c. v0x300 to v0x1ffff are divided among function call vectors in user mode, descriptor-table pointers for process ID (PID), and Process-Control-Block (PCB).

10. A CPU according to claim 2, wherein the CPU creates three interface signals for synchronous burst data transfers with a synchronous clock signal (SYNCLK), a synchronous stop signal (SYNSTP1), and a second synchronous stop signal (SYNSTP2), wherein all block transfers of data array in a main memory from and to a user register set, and a kernel register set, are burst transfers utilizing the three interface signals which are controlled by the CPU, wherein the signal SYNSTP2 is needed when an Input-Output (I/O) transfer is involved, in which the I/O transfer is a signal coming from the I/O, and wherein 32-bit word is transferred on every SYNCLK transition, with the SYNCSTP1 and SYNCSTP2 signals indicating an end of transfer.

11. A CPU according to claim 2, wherein the CPU removes the need for multiple bus arbiters, in using only one main bus arbiter with FIFOs, and wherein only one arbiter is necessary even for complex designs.

12. A CPU according to claim 2, wherein the CPU can execute a DMA transfer mimicking conventional method using an INT-INTA signal pair in conjunction with synchronous signals SYNCLK, SYNSTP1, and SYNSTP2 without disabling a memory bus.

13. A CPU according to claim 2, wherein the CPU alternatively can execute a DMA transfer mimicking conventional method in disabling a memory bus by using CPU instruction busd (bus diasable) by using an INT-INTA signal pair in conjunction with synchronous signals SYNCLK, SYNSTP1, and SYNSTP2 in the addition to another two signals, HALT and UHALT signals.

14. A CPU according to claim 1, wherein the CPU implements an I/O register file (IOR) consisting of a memory space of 1024 words in which 1 word equals 32-bit accessible by a 12-bit byte addressable lines A0 to A11, wherein the IOR is an internal dual-ported read-write memory that can be used to store often-used variables and to implement autonomous I/O devices (such as event counters, realtime clock, and device configuration), wherein the CPU eliminates need for polling and avoids the main memory bus access, in which a hardware function, which requires an independent local bus which is not blocked by CPU memory bus transaction, can be implemented, wherein the IOR is part of a processor I/O addressing space which uses an Input/Output Read signal (IORD), and an Input/Output Write signal (IOWR) in accessing devices, in particular an I/O arbiter chip, and wherein the IOR is implemented internally.

15. A CPU according to claim 1, wherein the interrupt stack is referenced on an interrupt service, wherein the current main CPU control registers consist of FS, FSP, PC, and PC1, and wherein the following CPU registers are saved respectively to their corresponding copies of interrupt save registers: a. an interrupt Flags/Status (FS-I), b. an interrupt Frame-Stack-Pointer (FSP-I), c. an interrupt Program-Counter (PC-I), and d. a second interrupt Program-Counter (PC1-I).

* * * * *